United States Patent
Heckerman et al.

(10) Patent No.: US 12,553,088 B1
(45) Date of Patent: Feb. 17, 2026

(54) HIGH-THROUGHPUT DEEP SEQUENCING OF NUCLEIC ACIDS ACROSS TUMORS AND CLONES WITHIN TUMORS

(71) Applicant: Amazon Technologies, Inc., Reno, NV (US)

(72) Inventors: David Heckerman, Bellevue, WA (US); Michael Vogelsong, Seattle, WA (US); Frank Wilhelm Schmitz, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 365 days.

(21) Appl. No.: 17/378,394

(22) Filed: Jul. 16, 2021

Related U.S. Application Data

(60) Provisional application No. 63/053,294, filed on Jul. 17, 2020.

(51) Int. Cl.
| | |
|---|---|
| *C12Q 1/6886* | (2018.01) |
| *C12Q 1/6869* | (2018.01) |
| *G16B 20/20* | (2019.01) |
| *G16B 30/10* | (2019.01) |

(52) U.S. Cl.
CPC .......... *C12Q 1/6886* (2013.01); *C12Q 1/6869* (2013.01); *G16B 20/20* (2019.02); *G16B 30/10* (2019.02); *C12Q 2600/156* (2013.01); *C12Q 2600/158* (2013.01)

(58) Field of Classification Search
CPC ................ C12Q 1/6886; C12Q 1/6869; C12Q 2600/156; C12Q 2600/158; G16B 30/10; G16B 20/20
See application file for complete search history.

(56) References Cited

U.S. PATENT DOCUMENTS

| | | | | |
|---|---|---|---|---|
| 2016/0273049 | A1* | 9/2016 | Velculescu | ............. G16B 20/20 |
| 2018/0135044 | A1* | 5/2018 | Sausen | ................. C12Q 1/6886 |

FOREIGN PATENT DOCUMENTS

| | | | | |
|---|---|---|---|---|
| WO | WO2015031691 | A1 * | 3/2015 | ........... C12Q 1/6888 |
| WO | WO2016100977 | A1 * | 6/2016 | ......... A61K 39/0011 |

OTHER PUBLICATIONS

Nik-Zainal el al., "The Life History of 21 Breast Cancers" Cell. 2012, vol. 149, pp. 994-1007 (Year: 2012).*
Wagenblast et al., "A model of breast cancer heterogeneity reveals vascular mimicry as a driver of metastasis", Nature. 2015, vol. 520, pp. 358-362 (Year: 2015).*
Severins et al. "Multiplex Single-Molecule DNA Barcoding Using an Oligonucleotide Ligation Assay", Biophysical Journal, 2018. vol. 115, pp. 957-967 (Year: 2018).*
Rosenthal et al. "Neoantigen-directed immune escape in lung cancer evolution", Nature 2018. vol. 567, pp. 479-495 (Year: 2018).*
Lan "Single-cell genome sequencing at ultra-high throughput with microfluidic droplet barcoding" Nature Biotech (2017) 35(7):640-646 (Year: 2017).*
Bhattacharjee "Classification of human lung carcinomas by mRNA expression profiling reveals distinct adenocarcinoma subclasses" Proc Natl Acad Sci USA (2001) 98: 13790-13795. (Year: 2001).*
Dahl et al. "Multigene amplification and massively parallel sequencing for cancer mutation discovery" 104(22) Proceedings of the National Academy of Sciences USA 9387-9392 (Year: 2007).*
Liszczak et al., "Nucleic Acid-Barcoding Technologies: Converting DNA Sequencing into a Broad-Spectrum Molecular Counter" 58 Andewandte Chemie International Edition 4144-4162 (Year: 2019).*

* cited by examiner

*Primary Examiner* — Nancy J Leith
(74) *Attorney, Agent, or Firm* — Hogan Lovells US LLP

(57) ABSTRACT

Disclosed herein are methods for profiling a cancerous tumor using a high-throughput sequencing technique.

25 Claims, No Drawings

HIGH-THROUGHPUT DEEP SEQUENCING OF NUCLEIC ACIDS ACROSS TUMORS AND CLONES WITHIN TUMORS

The present application claims the benefit of U.S. Provisional Application No. 63/053,294 filed on Jul. 17, 2020, which is incorporated herein by reference in its entirety.

1. BACKGROUND

Cancer is a leading cause of death worldwide accounting for 1 in 4 of all deaths. Siegel et al., CA: A Cancer Journal for Clinicians, 68:7-30 (2018). Tumors are composed of a heterogeneous population of cells that are characterized by cellular sub-populations evolving distinct genotypes and phenotypes. Greaves and Maley, Nature, 481:306-313 (2012). Each individual's cancer has a unique combination of genetically diverse tumor sub-populations caused by somatically acquired mutations in response to their environment. Id. This genetic heterogeneity between tumors is one of the reasons why many currently available cancer therapeutics fail.

The ability to accurately assess and investigate the clonal makeup of each individual's cancer is limited when using traditional methods. The traditional method for sequencing each sub-clone is to sequence the DNA/RNA of each tumor cell individually. These traditional approaches are error prone because it is difficult to produce sufficient sequencing reads from a single cell. These approaches are also slow and expensive. In addition, minor sub-clones that can drive tumor growth and be an important source of resistance and basis for relapse, are often present at low frequencies and often below the detection limit of conventional sequencing techniques.

The inventors of the present invention have developed a method for profiling cancerous tumors. This method differs from other methods presently available, in that the method reconstructs tumor sub-clones that account for most tumor clones in a tumorous cancer sample. The method can identify both dominant and minor sub-clones within a tumor.

2. SUMMARY

The present disclosure relates to methods of profiling cancerous tumors. The methods disclosed herein involve harvesting genetic material from biological material comprising a plurality of tumor cells from a subject, attaching a molecular barcode to the genetic material and performing molecular barcode sequencing of the genetic material to yield sequence reads. Molecular barcode sequencing can be performed using next generation sequencing or single-cell RNA sequencing. The generated sequence reads are assembled into a tumor cell sequence. Then the tumor cell sequences are clustered to yield self-similar tumor cells. A cluster of self-similar tumor cells are deemed to be a tumor sub-clone. The sequence reads representing each tumor sub-clone are pooled and variant calls of the tumor sub-clones are performed. Sequence coverage of tumor sub-clones within the cancerous tumor can be obtained using this method. The genome of tumor sub-clones can also be derived from this method. Obtaining the sequence coverage of tumor sub-clones within the cancerous tumor and/or determining the genome of a tumor sub-clone is considered to be profiling the tumor cells within the cancerous tumor. The method can further comprise filtering sequence reads to exclude sequence reads that are not associated with tumor cells after the step of performing molecular barcode sequencing of the genetic material. Genetic material can comprise any type of nucleic acid, including DNA or RNA. RNA is a preferred genetic material that is used in the methods disclosed herein.

The methods disclosed herein can be used to profile cancerous tumors using RNA. When RNA is used, the method comprises harvesting RNA from a biological material comprising a plurality of tumor cells of a subject, attaching a molecular barcode to the RNA, and performing single-cell RNA sequencing of the RNA to yield sequence reads. Molecular barcode sequencing can be performed using singe-cell RNA sequencing. The sequence reads of the RNA are then assembled into a tumor cell sequence. The tumor cell sequence is then clustered to yield self-similar tumor cells. A cluster of self-similar tumor cells are assigned as a tumor sub-clone. The reads representing each of the tumor sub-clones is then pooled and variant calls for each tumor sub-clone is performed. Sequence coverage of tumor sub-clones within the cancerous tumor can be obtained using this method. The genome of tumor sub-clones can also be derived from this method. Obtaining the sequence coverage of tumor sub-clones within the cancerous tumor and/or determining the genome of a tumor sub-clone is considered to be profiling the tumor cells within the cancerous tumor.

The biological material used in the methods disclosed herein can be from a tumor site or circulating tumor cells from the blood. The biological material can be obtained by a tumor biopsy. The tumor biopsy can be a solid tumor, a primary tumor, or a metastasized tumor, for example. The methods disclosed herein preferably use biological material derived from a fresh sample.

The methods are also suitable for breast cancer, ovarian cancer, prostate cancer, lung cancer, kidney cancer, gastric cancer, colon cancer, testicular cancer, head and neck cancer, pancreatic cancer, brain cancer, melanoma, lymphoma, or leukemia. The cancer is preferably breast cancer or melanoma. Alternatively, the cancer is preferably, lung cancer, colon cancer, gastric cancer, head and neck cancer, or leukemia. The methods disclosed herein can also be suitable for hematological cancer.

The methods disclosed herein can comprise attaching a molecular barcode to the genetic material (e.g., DNA, RNA). The molecular barcode is typically a nucleotide sequence. In particular, an oligonucleotide. The oligonucleotide can include 2 to 60 nucleotides. In instances, the molecular barcode can be integrated into the genome of the genetic material. In some cases, the molecular barcode can be ligated to the 3' end of the genetic material or it can be ligated to the 5' end of the genetic material. The genetic material can further comprise an adaptor sequence.

The methods provided herein can be used to sequence at least one tumor sub-clone. The methods can also be used to obtained sequence coverage of at least 2 sub-clones. The sub-clones can be primary sub-clones. In some instances, the sequence coverage of all of the primary clones is obtained. Sequencing of tumor sub-clones enables characterization of the genomic profiles that arise in a cancerous tumor of a subject. For example, the method can be used to identify tumor neoantigens, identify dominant tumor sub-clones as well as minor sub-tumor clones. The method can also be used to identify tumor specific variants. The method can also be used to identify allelic mutations.

3. DETAILED DESCRIPTION

This disclosure relates to methods of profiling cancerous tumor in a subject. The methods disclosed herein enable characterization of tumor sub-clones. The methods can be used to obtain sequence coverage of sub-clones (e.g., dominant and minor sub-clones). The methods disclosed herein involve harvesting genetic material from biological material comprising a plurality of tumor cells from a subject, attaching a molecular barcode to the genetic material and performing molecular barcode sequencing of the genetic material to yield sequence reads. The generated sequence reads are assembled into a tumor cell sequence, self-similar tumor cells are clustered, and then assigned to a tumor sub-clone. Lastly the sequence reads representing each tumor sub-clone are pooled and variant calls of the tumor sub-clones are performed.

Certain illustrative and preferred embodiments are described in detail herein. The embodiments within the specification should not be construed to limit the scope of the disclosure.

All publications and patents cited in this disclosure are incorporated by reference in their entirety. To the extent the material incorporated by reference contradicts or is inconsistent with this specification, the specification will supersede any such material. The citation of any references herein is not an admission that such references are prior art to the present disclosure. When a range of values is expressed, it includes embodiments using any particular value within the range. Further, reference to values stated in ranges includes each and every value within that range. All ranges are inclusive of their endpoints and combinable. When values are expressed as approximations, by use of the antecedent "about," it will be understood that the particular value forms another embodiment. Reference to a particular numerical value includes at least that particular value, unless the context clearly dictates otherwise. The use of "or" will mean "and/or" unless the specific context of its use dictates otherwise.

Various terms relating to aspects of the description are used throughout the specification and claims. Such terms are to be given their ordinary meaning in the art unless otherwise indicated. Other specifically defined terms are to be construed in a manner consistent with the definitions provided herein. The techniques and procedures described or referenced herein are generally well understood and commonly employed using conventional methodologies by those skilled in the art, such as, for example, the widely utilized molecular cloning methodologies described in Sambrook et al., Molecular Cloning: A Laboratory Manual 4th ed. (2012) Cold Spring Harbor Laboratory Press, Cold Spring Harbor, NY. As appropriate, procedures involving the use of commercially available kits and reagents are generally carried out in accordance with manufacturer-defined protocols and conditions unless otherwise noted.

As used herein, the singular forms "a," "an," and "the" include plural forms unless the context clearly indicates otherwise. The terms "include," "such as," and the like are intended to convey inclusion without limitation, unless otherwise specifically indicated.

Unless otherwise indicated, the terms "at least," "less than," and "about," or similar terms preceding a series of elements or a range are to be understood to refer to every element in the series or range. Those skilled in the art will recognize, or be able to ascertain using no more than routine experimentation, many equivalents to the specific embodiments of the invention described herein. Such equivalents are intended to be encompassed by the following claims.

The term "molecular barcode" or "barcode" as used herein refers to a label or identifier that attaches to a target nucleic acid sequence. The target nucleic acid sequence can be a deoxyribonucleic acid (DNA) or ribonucleic acid (RNA). The barcode typically comprises a unique nucleic acid sequence specific for each target nucleic acid sequence. The barcode can come in a variety of formats, for example, random nucleic acid sequences or synthetic nucleic acid sequences. Barcodes can be added to the sample before or during sequencing of a sample. The barcodes allow for the identification and quantification of individual sequencing reads and can be used to identify the originating source of a target nucleic acid sequence.

The term "cancer" refers to the physiological condition in mammals in which a population of cells is characterized by uncontrolled proliferation, immortality, metastatic potential, rapid growth and proliferation rate and/or certain morphological features. Often cancers can be in the form of a tumor or mass, but may exist alone within the subject, or may circulate in the blood stream as independent cells, such a leukemic or lymphoma cells. The term cancer includes all types of cancers and metastases, including hematological malignancy, solid tumors, sarcomas, carcinomas and other solid and non-solid tumors. Examples of cancers include, but are not limited to, carcinoma, lymphoma, blastoma, sarcoma, and leukemia. More particular examples of such cancers include squamous cell cancer, small cell lung cancer, non-small cell lung cancer, adenocarcinoma of the lung, squamous carcinoma of the lung, cancer of the peritoneum, hepatocellular cancer, gastrointestinal cancer, pancreatic cancer, glioblastoma, cervical cancer, ovarian cancer, liver cancer, bladder cancer, hepatoma, breast cancer (e.g., triple negative breast cancer), osteosarcoma, melanoma, colon cancer, colorectal cancer, endometrial (e.g., serous) or uterine cancer, salivary gland carcinoma, kidney cancer, liver cancer, prostate cancer, vulval cancer, thyroid cancer, hepatic carcinoma, and various types of head and neck cancers. Triple negative breast cancer refers to breast cancer that is negative for expression of the genes for estrogen receptor (ER), progesterone receptor (PR), and Her2/neu.

As used herein, the term "harvest" refers to the isolation and extraction of genetic material (e.g., DNA or RNA) obtained from biological material. Those of skill in the art will be familiar with methods of DNA and/or RNA extraction.

The term "next generation sequencing" or "NGS" as used herein refers to sequencing technologies having increased throughput as compared to traditional approaches (e.g., Sanger sequencing), with the ability to generate hundreds of thousands of sequence reads at a time.

The term "self-similar tumor cells" herein refers to tumor cells that are genetically derived from the same sub-clone. This can be determined based on sequence similarity and/or the tumor cells genotype.

The term "sequencing" as used herein, refers to methods and technologies for determining the sequence of nucleotide bases in one or more polynucleotides (e.g. DNA or RNA). Sequencing devices can provide a plurality of sequence reads corresponding to the genetic information of the biological material of a subject.

The term "subject" herein refers to any animal, such as any mammal, including but not limited to, humans, non-human primates, rodents, and the like. In some embodiments, the mammal is a mouse. In some embodiments, the mammal is a human.

The term "tumor cell" herein refers to any cell that is a cancer cell or is derived from a cancer cell. The term "tumor cell" can also refer to a cell that exhibits cancer-like properties, e.g., uncontrollable reproduction, resistance to antigrowth signals, ability to metastasize, and loss of ability to undergo programed cell death.

The term "tumor clone" as used herein refers to a group of tumor cells that have a shared ancestry lineage. The group of tumor cells share a highly similar genotype and mutational profile.

The term "tumor sub-clone" as used herein refers to a subpopulation of tumor cells that descended from a tumor clone but has diverged in lineage and has acquired additional mutations.

This disclosure relates to a novel method for profiling cancerous tumors. The method disclosed herein differs from other methods presently available, in that the method reconstructs tumor sub-clones such that sequence coverage of tumor sub-clones is achieved. The methods disclosed herein enable high-throughput sequencing of tumor clones with high sensitivity and accuracy. Sequencing of tumor sub-clones enables characterization of the genomic profiles that arise in a cancerous tumor of a subject. For example, the method can be used to identify tumor neoantigens, identify dominant tumor sub-clones as well as minor tumor sub-clones. The method can also be used to identify tumor specific variants.

The method of profiling cancerous tumors first comprises harvesting genetic material comprising a plurality of tumor cells of a subject. Genetic material can comprise any type of nucleic acid, including DNA or RNA. RNA is a preferred genetic material that is used in the methods disclosed herein. Once the genetic material is harvested, a molecular barcode is attached to the genetic material. Each DNA or RNA fragment derived from the harvesting step can be attached to a molecular barcode, as further described herein. Then the barcoded nucleic acid fragments are subject to sequence analysis to yield sequence reads. The method for sequencing the genetic material can depend on the type of genetic material used in the method. Once sequence reads are generated from sequencing the genetic material, the sequence reads are subjected to sequence analysis. Sequence analysis comprises assembly sequence reads of the genetic material into a tumor cell sequence. In particular, the sequence reads are consolidated into one read per nucleic acid molecule (i.e., the nucleic acid encoding a specific tumor cell).

This sequence analysis approach reconstructs the sequence read into its originating nucleic acid molecule (a tumor cell sequence). Once the sequence reads have been aligned to their originating nucleic acid (i.e., the nucleic acid encoding a tumor cell), self-similar tumor cells are mapped and clustered to a corresponding tumor sub-clone. Hierarchical clustering is the preferred mapping and clustering approach employed by the methods disclosed herein. Sequence reads assigned to a tumor sub-clone are then be pooled. Following pooling of the sequence reads encoding tumor sub-clones, variant calls for each tumor sub-clone are then performed. Variant calling sorts out the sequence reads into separate sequences that encode tumor sub-clones and thereby provide sequence coverage of tumor clones can be obtained. Further disclosure relating to the method is provided herein.

A. Harvesting Genetic Material

The methods disclosed herein comprise harvesting genetic material from biological material comprising tumor cells obtained from a subject. The genetic material described herein comprises polynucleotides. A polynucleotide can comprise any type of nucleic acid, including DNA or RNA. DNA can be genomic DNA, complementary DNA, circulating tumor DNA, or any other deoxyribonucleic acid. RNA can be messenger RNA (mRNA), short-interfering RNA (siRNA), microRNA (miRNA), circulating RNA (cRNA), transfer RNA (tRNA), ribosomal RNA (rRNA), small nucleolar RNA (snRNA), Piwi-interacting RNA (piRNA), long non-coding RNA (long ncRNA), or any other RNA. The polynucleotide can be single-stranded or double stranded, or a combination of both. Typically, DNA or RNA genetic material can be harvested from the biological material. While DNA and RNA genetic material can be used in the methods disclosed herein, RNA is a preferred genetic material.

The genetic material described herein can be harvested (i.e., extracted from the biological material) using a variety of techniques. Techniques and methods of harvesting DNA and/or RNA are well understood and can be commonly employed using conventional methodologies by those skilled in the art. Known extraction methods in the art typically employ the steps of: disrupting cells or tissues of the biological material, denaturing nucleoprotein complexes, inactivating nucleases (e.g., RNAase for RNA extraction and DNAase for DNA extraction), and removing contaminants (e.g., protein, carbohydrate, lipids, or other nucleic acid, for example, DNA free of RNA or RNA free of DNA). After tissue or cells have been obtained from a subject, it is often preferable to lyse or fragment cells in order to isolate nucleic acids. Lysing methods are well known in the art. For example, lysing methods may include, but are not limited to, freezing, sonication, exposure to detergents, or boiling.

Nucleic acid extraction techniques can include, for example, guanidinium thiocyanate-phenol-chloroform extraction, alkaline extraction, cetyltrimethylammonium bromide extraction, ethidium bromide (EtBr)-cesium chloride (CsCl) gradient centrifugation, purification of Poly (A)+RNA by Oligop(dT)-Cellulose chromatography, solid-phase nucleic acid extraction, diatomaceous earth, and magnetic bead based nucleic acid purification. Automated extraction systems for nucleic acid extraction can also be employed.

In some cases, polynucleotides can be harvested using commercially available kits such as the Qiagen Qiamp®, Circulating Nucleic Acid Kit protocol, Qiagen Qubit™ dsDNA HS Assay kit protocol, Agilent™ DN, a 1000 kit, or TruSeq™ Sequencing Library Preparation, Low-Through-put protocol. In other instances, RNA can be harvested using commercially available kits such as RiboPure-Bacteria Kit (Ambion, Inc), PureLink RNA Mini Kit (Invitrogen), Ultra-Clean Microbial RNA Isolation Kit (MoBio), RNeasy Mini Kit (QIAGEN) and MasterPure RNA Purification Kit (EPI-CENTRE Biotechnologies).

In some embodiments, the harvested polynucleotide fragments are at least 100 nucleotides in length, at least 200 nucleotides in length, at least 300 nucleotides in length, at least 400 nucleotides in length, at least 500 nucleotides in length, at least 600 nucleotides in length, at least 700 nucleotides in length, at least 800 nucleotides in length, at least 900 nucleotides in light, at least 1000 nucleotides in length or more. In other embodiments, the harvested polynucleotide fragments are in a range from about 100-1000 nucleotides in length, about 200 to about 1000 nucleotides in length, about 300 to about 1000 nucleotides in length, about 400 to about 1000 nucleotides in length, about 500 to about 1000 nucleotides in length, about 200 to about 800 nucleotides in length, about 300 to about 800 nucleotides in length, or about 400 to about 800 nucleotides in length.

After harvest, the genetic material may yield at least 1 µg of the nucleic acid (e.g., DNA or RNA), at least 2 µg of nucleic acid, at least 3 µg of nucleic acid, at least 4 µg of nucleic acid, at least 5 µg of nucleic acid, at least 6 µg of nucleic acid, at least 7 µg of nucleic acid, at least 8 µg of nucleic acid, at least 9 µg of nucleic acid, at least 10 µg of nucleic acid, at least 11 µg of nucleic acid, at least 12 µg of nucleic acid, at least 13 µg of nucleic acid, at least 14 µg of nucleic acid, at least 15 µg of nucleic acid, at least 16 µg of nucleic acid, at least 17 µg of nucleic acid, at least 18 µg of nucleic acid, at least 19 µg of nucleic acid, at least 20 µg of nucleic acid, at least 21 µg of nucleic acid, at least 22 µg of nucleic acid, at least 23 µg of the nucleic acid, at least 24 µg of nucleic acid, at least 25 µg of nucleic acid, at least 26 µg of nucleic acid, at least 27 µg of nucleic acid, at least 28 µg of nucleic acid, at least 29 µg of nucleic acid, at least 30 µg of nucleic acid or more.

After harvest, the genetic material may yield at least 0.01 ng of nucleic acid, at least 0.02 ng of nucleic acid, at least 0.03 ng of nucleic acid, at least 0.04 ng of nucleic acid, at least 0.05 ng of nucleic acid, at least 0.06 ng of nucleic acid, at least 0.07 ng of nucleic acid, at least 0.08 ng of nucleic acid, at least 0.09 ng of nucleic acid, at least 0.10 ng of nucleic acid, at least 0.11 ng of nucleic acid, at least 0.12 ng of nucleic acid, at least 0.13 ng of nucleic acid, at least 0.14 ng of nucleic acid, at least 0.15 ng of nucleic acid, at least 0.16 ng of nucleic acid, at least 0.17 ng of nucleic acid, at least 0.18 ng of nucleic acid, at least 0.19 ng of nucleic acid, at least 0.20 ng of nucleic acid, at least 0.21 ng of nucleic acid, at least 0.22 ng of nucleic acid, at least 0.23 ng of nucleic acid, at least 0.24 ng of nucleic acid, at least 0.25 ng of nucleic acid, at least 0.26 ng of nucleic acid, at least 0.27 ng of nucleic acid, at least 0.28 ng of nucleic acid, at least 0.29 ng of nucleic acid, at least 0.30 ng of nucleic acid, or more.

After harvest, the genetic material may yield 1 ng of the nucleic acid, at least 5 ng of nucleic acid, at least 10 ng of nucleic acid, at least 20 ng of nucleic acid, at least 30 ng of nucleic acid, at least 40 ng of nucleic acid, at least 50 ng of nucleic acid, at least 100 ng of nucleic acid, at least 150 ng of nucleic acid, at least 200 ng of nucleic acid, at least 250 ng of nucleic acid, at least 300 ng of nucleic acid, at least 400 ng of nucleic acid, at least 500 ng of nucleic acid or more.

After harvest, the genetic material may yield about 5 ng to about 500 ng of nucleic acid, about 10 ng to about 500 ng of nucleic acid, about 15 ng to about 500 ng of nucleic acid, about 20 ng to about 500 ng of nucleic acid, about 30 ng to about 500 ng of nucleic acid, about 40 ng to about 500 ng of nucleic acid, about 50 ng to about 500 ng of nucleic acid, about 50 ng to about 500 ng of nucleic acid, about 60 ng to about 500 ng of nucleic acid, about 70 ng to about 500 ng of nucleic acid, about 80 ng to about 500 ng of nucleic acid, about 90 ng to about 500 ng nucleic acid, about 100 ng to about 500 ng of nucleic acid, about 150 ng to about 500 ng of nucleic acid, about 200 ng to about 500 ng of nucleic acid, about 300 ng to about 500 ng nucleic, about 350 nucleic acid to about 500 ng of nucleic acid, about 400 ng to about 500 ng of nucleic acid.

After harvest, the genetic material may yield at least 1 µg of nucleic acid (e.g., DNA or RNA), at least 5 µg of nucleic acid, at least 10 µg of nucleic acid, at least 20 µg of nucleic acid, at least 30 µg of nucleic acid, at least 40 µg of nucleic acid, at least 50 µg of nucleic acid, at least 100 µg of nucleic acid, at least 150 µg of nucleic acid, at least 200 µg of nucleic acid, at least 250 µg of nucleic acid, at least 300 µg of nucleic acid, at least 400 µg of nucleic acid, at least 500 µg of nucleic acid or more.

Alternatively, single cells can be isolated from the biological material comprising tumor cells obtained from a subject. Approaches for isolating single cells from the biological material can include, but are not limited to, limiting dilution, micromanipulation, flow-activated cell sorting (FACS), laser capture, microdissection (LCM), and microfluidics. See, Gross et al., Int. J. Mol. Sci., 16:16897-16919 (2015). FACs is the preferred method for isolating single cells from biological material. In this method, cells are typically tagged with a fluorescent monoclonal antibody, which recognizes specific surface markers and enables sorting of distinct populations. Negative selection is also possible for unstained populations.

Isolation of single cells can yield at least 10 tumor cells, at least 20 tumor cells, at least 30 tumor cells, at least 40 tumor cells, at least 50 tumor cells, at least 60 tumor cells, at least 70 tumor cells, at least 80 tumor cells, at least 90 tumor cells, at least 100 tumor cells, at least 200 tumor cells, at least 300 tumor cells, at least 400 tumor cells, at least 500 tumor cells, at least 1,000 tumor cells, at least 2,000 tumor cells, at least 3,000 tumor cells, at least 4,000 tumor cells, at least 5,000 tumor cells, at least 6,000 tumor cells, at least 7,000 tumor cells, at least 8,000 tumor cells, at least 9,000 tumor cells, at least 10,000 tumor cells, at least 20,000 tumor cells, at least 30,000 tumor cells, at least 40,000 tumor cells, at least 50,000 tumor cells, at least 100,000 tumor cells or more.

After harvest, the genetic material primarily consists of tumor derived genetic material and minimal genetic material from normal cells. For example, the harvested genetic material comprises at least 70%, at least 75%, at least 80%, at least 85%, at least 90%, at least 91%, at least 92%, at least 93%, at least 94%, at least 95%, at least 96%, at least 97%, at least 98%, at least 99% or higher tumor derived genetic material. Alternatively, the harvested genetic material comprises less than 10%, less than 9%, less than 8%, less than 7%, less than 6%, less than 5%, less than 4%, less than 3%, less than 2%, or less that 1% of genetic material derived from normal cells.

B. Molecular Barcodes

Contemplated herein are molecular barcodes that are attached to the genetic material. Molecular barcodes are nucleotide sequences having identifiable sequences such that the target nucleic acids, which the barcode is attached to, can be identified. Without being bound by theory, it is believed that the barcode sequence provides a high-quality individual read of a barcode associated with a target nucleic acid sequence. Sequence reads that have different molecular barcodes represent different original nucleic acid molecules, while reads that have the same barcodes are the result of PCR duplication from the same original molecule (e.g., a tumor cell).

Each DNA or RNA polynucleotide fragment derived from the harvesting step can be attached to a unique molecular barcode. Generally, a molecular barcode is attached to each DNA or RNA polynucleotide fragment in the harvested genetic material. In some embodiments, at least about 50%, at least about 60%, at least about 65%, at least about 70%, at least about 75%, at least about 80%, at least about 85%, at least about 90%, at least about 95%, at least about 96%, at least about 97%, at least about 98%, at least about 99% or more of the DNA or RNA polynucleotides derived from the harvesting step attach to a molecular barcode.

Generally, the molecular barcode is an oligonucleotide. Suitable molecular barcodes are typically at least 2, 3, 4, 5, 6, 7, 8, 9, 10, 11, 12, 13, 14, 15, 16, 17, 18, 19, 20, 25, 30, 35, 40, 45, 50, 75, 100, 150, 200, 250, 300, 350, 400, 450, 500 or more nucleotides in length. In other embodiments, the molecular barcodes can be at least 2 to about 60 nucleotides in length. These nucleotides can be contiguous or they can be separated into two or more separate subsequences by one or more nucleotides. In one exemplary embodiment, the contiguous oligonucleotide is a N-mer, where N is an integer selected from the set. In other words, the molecular barcode can be a contiguous set of nucleotide positions (e.g., 4 contiguous nucleotide positions, 5 contiguous nucleotide positions, 6 contiguous nucleotide positions, 7 contiguous nucleotide positions, 8 contiguous nucleotide positions, 9 contiguous nucleotide positions, 10 contiguous nucleotide positions, 11 contiguous nucleotide positions, 12 contiguous nucleotide positions, 13 contiguous nucleotide positions, 14 contiguous nucleotide positions, 15 contiguous nucleotide positions, 16 contiguous nucleotide positions, 17 contiguous nucleotide positions, 18 contiguous nucleotide positions, 19 contiguous nucleotide positions, or 20 contiguous nucleotide positions).

In some embodiments, the molecular barcodes differ in length compared to the attached polynucleotide. For example, the molecular barcode may be shorter than the attached polynucleotide. In other cases, the molecular barcodes are the same length as the attached polynucleotide. In general, the molecular barcodes are of sufficient length and comprise sequences that are sufficiently different to allow for identification of the harvested RNA or DNA polynucleotides based on the molecular barcodes with which they are associated. In embodiments, the molecular barcode and the harvested DNA or RNA polynucleotide which it is associated with can be identified after a mutation, insertion, or deletion of one or more nucleotides in the barcode sequence.

In some embodiments, a single barcode is attached to each DNA or RNA polynucleotide fragment. Preferably, each barcode is unique (i.e., different) for each DNA or RNA polypeptide fragment derived from the harvesting the genetic material. The barcodes can differ by at least 1 at least 2, at least 3, at least 4, at least 5, at least 6, at least 7, at least 8, at least 9, at least 10 or more nucleotides. In an alternative embodiment, a plurality of barcodes (i.e., two or more barcodes) can be attached to each DNA or RNA polynucleotide fragment. Each barcode in a plurality of barcodes differs from every other barcode in the plurality by at least two or more nucleotides. The plurality of barcodes can differ by at least 2, at least 3, at least 4, at least 5, at least 6, at least 7, at least 8, at least 9, at least 10 or more nucleotides. A plurality of barcodes can comprise barcodes of the same or different lengths. In some cases, the plurality of molecular barcodes are not necessarily unique to one another in the plurality. In some instances, the molecular barcodes comprise nucleotide sequences that are at least 50%, at least 60%, at least 70%, at least 80%, at least 90%, at least 95%, at least 97%, at least 98%, or 99% different from one another.

The molecular barcodes described herein can contain naturally occurring nucleic acid bases (e.g., adenosine (A), cytosine (C), uracil (U), guanosine (G), or thymidine (T)). The molecular barcodes described herein can include, but are not limited to, the following sequences, TTGAGCCT, AGTTGCTT, CCAGTTAG, ACCAACTG, GTATAACA or CAGGAGCC. An alternative molecular barcode can comprise non-naturally occurring bases. Exemplary non-naturally occurring bases include, but are not limited to, aminoally-uridine, iso-cytosines, and isoguanine.

Molecular barcodes can be exogenous molecular barcodes or endogenous molecular barcodes. See, Salk et al., Nat. Reb. Genet., 19(5):269-285 (2018). Exogenous barcodes entail random or semi-random artificial sequences that are incorporated into either sequencing adaptors or PCR primers. Id. Endogenous barcodes describe the randomly or semi-randomly generated fragmentation points at the ends of DNA molecules in ligation-based library preparation methods. Id. These approaches can be used alone or in combination.

The molecular barcodes disclosed herein can be attached to the 5' end of a polynucleotide fragment, the 3' end of a polynucleotide fragment, or both the 5' end of a polynucleotide fragment and the 3' end of a polynucleotide fragment. In some instances, the molecular barcode attaches to one end of the polynucleotide fragment. Alternatively, a first molecular barcode can attach to either the 5' end or 3' end of a polynucleotide fragment and a second molecular barcode can attach to either the 5' end or 3' end of a polynucleotide fragment. When the first molecular barcode attaches to the 5' end of the polynucleotide fragment, the second molecular barcode attaches to the 3' end of the polynucleotide fragment. When the second molecular barcode attaches to the 3' end of the polynucleotide fragment, the first molecular barcode attaches to the 5' end of the polynucleotide fragment. The molecular barcodes can be attached using a variety of techniques known to those of skill in the art. For example, attachment can be performed by methods including ligation or annealing-optimized molecular-inversion probes.

In some situations, viral delivery of barcodes can be used. Using this method, a viral library encoding a collection of barcoded sequences (such as mRNA sequences) can be injected into a sample comprising tumor cells. The barcodes travel through the sample by active processes or by diffusion. Without wishing to be bound by theory, molecular barcodes that are delivered using viral delivery are incorporated into the genome of the genetic material. In embodiments, the molecular barcode can be integrated into the genome of the genetic material. When the sample is then further processed, barcodes can be correlated with structural positions to identify nucleic acid sequences from the same geographic location within the sample. In examples in which the barcodes are distributed through the sample by active processes, sequences with the same barcode may be geographically connected and/or connected by the same process.

Molecular barcoding can be achieved using barcoded gel beads as described in U.S. Pat. No. 10,428,326, for example. The gel bead can contain a barcode that is used to barcode nucleic acid molecules of the genetic material.

Adaptor sequences incorporating barcodes can alternatively be used. One such example is the "Y adaptor" used in Illumina sequencing. Other examples include hairpin shaped adapters or bubble adaptors. Bubble shaped adaptors have non-complementary sequences flanked on both sides by complementary sequences. In some embodiments, a Y-shaped adaptor comprises 2, 3, 4, 5, 6, 7, 8, 9, 10, 11, 12, 13, 14, 15, 20, 25, 30 or more nucleotides in length. Techniques for attaching adaptors are well known by those skilled in the art. Alternatively, the genetic material can further comprise an adaptor sequence.

In some instances, the methods described herein include a step in which the genetic material and molecular barcodes can be selectively amplified prior to sequencing. Amplification can be performed using routine methods known in the art, including without limitation, Polymerase Chain Reaction (PCR) amplification. This amplification provides at least about 1×, about 10×, about 20×, about 50×, about 100×, about 200×, about 500×, about 1000×, about 1500×, about 2000×, about 5000×, or about 10000× coverage of the selected regions of the genetic material, thereby providing a quantity of nucleic acids to allow de novo sequencing. The amplification can provide at least 1×, about 20×, about 50×-100×, about 200×-1000×, about 1500×-5000×, about 5000×-10000×, about 1000×-10000×, about 1500×, about 9000×, about 2000×-8000×, about 2500×-7000×, about 3000×-6500×, about 3500×-6000×, about 4000×-5500× coverage of the selected genetic material. Amplification is generally conducted through extension of primers complementary to sequences of the genetic material.

C. Methods of Analyzing Genetic Material

The barcoded nucleic acid fragments are then subjected to sequence analysis. Sequencing can be performed using the nucleic acids described herein such as genomic DNA, cDNA derived from RNA transcripts, or RNA.

A variety of methods exist for sequencing the genetic material described herein. Sequencing methods are well known in the art and include, but are not limited to, PCR-based methods, including real-time PCR (RT-PCR), whole exome sequencing, deep sequencing, high-throughput sequencing, or combinations thereof. In some embodiments, the foregoing techniques and procedures are performed according to the methods described in e.g., Sambrook et al., *Molecular Cloning: A Laboratory Manual* 4th ed. (2012) Cold Spring Harbor Laboratory Press, Cold Spring Harbor, NY. See also, Austell et al., *Current Protocols in Molecular Biology*, ed., Greene Publishing and Wiley-Interscience New York (1992) (with periodic updates).

The sequencing method employed herein is preferably high throughput sequencing. High throughput sequencing technologies are capable of sequencing multiple nucleic acid molecules in parallel, enabling millions of nucleic acid molecules to be sequenced at a time. See, Churko et al., Circ. Res. 112(12):1613-1623 (2013).

Sequencing methods may include, but are not limited to, high-throughput sequencing pyrosequencing, sequencing-by synthesis, single-molecule sequencing, nanopore sequencing, semiconductor sequencing, sequencing-by-synthesis, sequencing-by-ligation, sequencing-by-hybridization, RNA-Sew (Illumina), Digital Gene Expression (Helicos), next generation sequencing, Single Molecule Sequencing by Synthesis (SMSS) (Helicos), massively-parallel sequencing, Clonal Single Molecule Array (Solexa), shotgun sequencing, Maxam-Hilbery or Sanger sequencing, primer walking, sequencing using PacBio, SOLid, Ion Torrent, or Nanopore platforms and any other sequencing methods known in the art.

In some cases, high-throughput sequencing can be next generation sequencing. There are a number of different next generation platforms using different sequencing technologies (e.g., using the HiSeq or MiSeq instruments available from Illumina (San Diego, California)). Any of these platforms can be employed for sequencing the genetic material disclosed herein. Next generation sequencing is based on sequencing a large number of independent reads, each representing anywhere between 10 to 1000 bases of nucleic acid. Sequencing by synthesis is a common technique used in next generation sequencing. In general, sequencing involves hybridizing a primer to a template to form a template/primer duplex, contacting the duplex with a polymerase in the presence of a detectably-labeled nucleotide under conditions that permit the polymerase to add nucleotides to the primer in a template-dependent manner. Signal from the detectable label is then used to identify the incorporated base and the steps are sequentially repeated in order to determine the linear order of nucleotides in the template. Exemplary detectable labels include radiolabels, florescent labels, enzymatic labels, etc. Numerous techniques are known for detecting sequences, such as the Illumina Next-Seq platform by cycle end sequencing.

An example of a high-throughput sequencing platform is the NextSeq 500 by Illumina. In brief, the NextSeq 500 system employs a two channel sequencing strategy. In this approach, cytosine is labeled red, thymine is labeled green, adenine is yellow, and guanine is unlabeled.

Another example of a high throughput sequencing technique that can be used in the methods provided herein is 454 sequencing (Roche) (Margulies et al., Nature, 437:376-380 (2005)). Roche 454 sequencing is based on pyrosequencing, a technique which detects pyrophosphate release using fluorescence. Roche 454 sequencing involves two steps. In the first step, DNA is sheared into fragments of approximately 300-800 base pairs, and the fragments are blunt ended. Oligonucleotide adaptors are then ligated to the ends of the fragments. The adaptors serve as primers for amplification and sequencing of the fragments. The fragments can be attached to DNA capture beads, e.g., streptavidin-coated beads using, e.g., Adaptor B, which contains 5'-biotin tag. The fragments attached to the beads are PCR amplified within droplets of an oil-water emulsion. The result is multiple copies of clonally amplified DNA fragments on each bead. In the second step, the beads are captured in wells (pico-liter sized). Pyrosequencing is performed on each DNA fragment in parallel. Addition of one or more nucleotides generates a light signal that is recorded by a camera in a sequencing instrument. The signal strength is proportional to the number of nucleotides incorporated. Pyrosequencing makes use of pyrophosphate (PPi) which is released upon nucleotide addition. PPi is converted to ATP by ATP sulfurylase in the presence of adenosine 5' phosphosulfate. Luciferase uses ATP to convert luciferin to oxyluciferin, and this reaction generates light that is detected and analyzed.

Yet another example of high throughput sequencing is Ion Torrent sequencing technology. Ion Torrent sequencing measures the direct release of H+protons from the incorporation of individual bases by DNA polymerase. Ion Torrent sequencing uses emulsion-PCR to clonally amplify adapter-ligated DNA fragments on the surface of beads. The beads are subsequently distributed into microwells where a sequencing-by-synthesis reaction occurs. Ion Torrent semiconductor sequencing measures pH changes induced by the release of hydrogen ions during DNA extension. These pH changes are detected by a sensor positioned at the bottom of the microwell and converted into a voltage signal. The voltage signal is proportional to the number of bases incorporated, and the sequential addition of individual nucleotides during each sequencing cycle allows base discrimination.

Another example of a sequencing technique that can be used in the methods of the provided invention is nanopore sequencing. See, e.g., Soni G V and Meller A. (2007) Clin Chem 53: (1996-2001). This sequencing technique can take a variety of forms, but relies on the transition of nucleic acid molecules through a small channel. As nucleic acid molecules (i.e., DNA) pass through a nanopore, each nucleotide on the nucleic acid molecule obstructs the nanopore to a different degree. The change in the current passing through the nanopore as the nucleic acid molecule passes through the nanopore represents a reading of the nucleic acid sequence. See, Churko et al., Circ. Res., 112(12):1613-1623 (2013).

SOLiD™ technology (Applied Biosystems) is another example of a next-generation sequencing technique that can be used in the methods provided herein. In SOLiD sequencing, genomic DNA is sheared into fragments, and adaptors are attached to the 5' and 3' ends of the fragments to generate a fragment library. Alternatively, internal adaptors can be introduced by ligating adaptors to the 5' and 3' ends of the fragments, circularizing the fragments, digesting the circularized fragment to generate an internal adaptor, and attaching adaptors to the 5' and 3' ends of the resulting fragments to generate a mate-paired library. Next, clonal bead populations are prepared in microreactors containing beads, primers, template, and PCR components. Following PCR, the templates are denatured and beads are enriched to separate the beads with extended templates. Templates on the selected beads are subjected to a 3' modification that permits bonding to a glass slide. The sequence can be determined by sequential hybridization and ligation of partially random oligonucleotides with a central determined base (or pair of bases) that is identified by a specific fluorophore. After a color is recorded, the ligated oligonucleotide is cleaved and removed and the process is then repeated.

Single-cell RNA-Seq (scRNA-seq) is another example of a sequencing technique that can be employed to analyze the barcoded nucleic acid fragments described herein. A number of scRNA-seq protocols have been developed, as described in Chen et al., Front. Genet., 10(317):1-13 (2019). Exemplary scRNA-seq protocols include, but are not limited to, Smart-seq2 (Picelli et a; Nat. Methods, 10:1096-1098 (2013)), MATQ-Seq (Sheng et al., Nat. Methods, 14:267-270 (2017)), Drop-seq (Macosko et al., Cell, 161:1202-1214 (2015)), Seq-Well (Gierahn et al., Nat. Methods, 14:395-398 (2017)), Chromium (Zheng et al., Nat. Commun. 8:14049 (2017)), DroNC-seq (Habib et al., Nat. Methods, 14:955-958 (2017)), or STRT-seq (Islam et al., Genome Res. 21:1160-1167 (2011)). scRNA-seq permits comparison of the transcriptomes of individual cells.

In general, the scRNA-seq approach requires isolation of viable, single cells from the tissue of interest. The isolated cells are then typically lysed to allow capture of RNA molecules. Next, mRNA is converted to complementary DNA (cDNA) by a reverse transcriptase. The reverse-transcription primers can also have other nucleotide sequences added to them, such as adaptor sequences for detection on next generation sequencing platforms or molecular barcodes, such as those disclosed herein. The cDNA can then be amplified by PCR or, in some instances, by in vitro transcription. Amplified and tagged cDNA from each cell is then pooled by next generation sequencing, typically using, for example, library preparation techniques, sequencing platforms and genomic-alignment tools. See, Haque et al., Genome Medicine, 9(75) (2017).

RNA-sequencing (RNA-seq) is a technique that can examine the quantity and sequences of RNA in a sample using high-throughput technologies (e.g., next generation sequencing). In general, RNA-Seq transcripts are reverse-transcribed into cDNA, and adapters are ligated to each end of the cDNA. Sequencing can be done either unidirectional (single-end sequencing) or bidirectional (paired-end sequencing) and then aligned to a reference genome database or assembled to obtain de novo transcripts, proving a genome-wide expression profile (Wang et al., Nature Reviews Genetics, 10:57-63 (2009)).

Other sequencing technologies can include whole genome sequencing (WGS) and whole exome sequencing (WES). WGS (also known as full genome sequencing, complete genome sequencing, or entire genome sequencing) determines the complete DNA sequence of a subject or a cell sample. Exemplary methods for WGS for sequencing the genetic material as described herein may include those described by Ng and Kirkness, Methods Mol Biol. 628:215-226 (2010). WES (also known as exome sequencing or targeted exome capture) allows for the analysis of many genes, but only exons. Exemplary methods for WES may include those described by Gnirke et al., Nature Biotechnology, 27:182-189 (2009).

In embodiments, the sequencing technology employed provides a read depth of at least 5×, at least 10×, at least 15×, at least 20×, at least 25×, at least 30×, at least 35×, at least 40×, at least 45×, at least 50×, at least 55×, at least 60×, at least 65×, at least 70×, at least 75×, at least 80×, at least 85×, at least 90×, at least 95×, at least 100× or greater. The term "read depth" is used to define the average number of times each nucleotide in the genome is observed. In general, as the read depth increases, the sequencing information becomes more confident. See, Buerkle et al., Mol. Ecol., 22(11):3028-3055 (2012). It is preferred that the sequencing technology employed herein produces a read depth of at least 30×.

In embodiments, the nucleic acids can be sequenced to a read depth of at least 1,000 reads per base, at least 2,000 reads per base, at least 3,000 reads per base, 4,000 reads per base, 5,000 reads per base, 6,000 reads per base, 7,000 reads per base, 8,000 reads per base, 9,000 reads per base, 10,00 reads per base, 20,000 reads per base, 30,000 reads per base, 40,000 reads per base, 50,000 reads per base, 60,000 reads per base, 70,000 reads per base, 80,000 reads per base, 90,000 reads per base, 100,000 reads per base, 200,000 reads per base, 300,000 reads per base, 400,000 reads per base, 500,000 reads per base.

In some embodiments, the read depth is sufficient to detect tumor derived nucleic acid sequences in a sample at a frequency as low as 0.05%, as low as 0.02%, as low as 0.01%, as low as 0.005%, as low as 0.002%, as low as 0.001%, as low as 0.0005%, or lower.

In some embodiments, the sequencing technology employed herein provides sequence coverage of at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, or greater, of the genetic material in a particular sample that is subjected to sequencing analysis.

In some embodiments, the sequencing technology employed herein has a capture efficiency of at least 65%, at least 70%, at least 75%, at least 80%, at least 85%, at least 90%, at least 95%, or greater. In particular, scRNA-seq when used in the methods disclosed herein has a capture efficiency of at least 65%, at least 70%, at least 75%, at least 80%, at least 85%, at least 90%, at least 95%, or greater.

D. Sequence Characterization of Tumor Cells

Disclosed herein is a framework for profiling cancerous tumors that provides sequence coverage of tumor sub-clones. The methods disclosed herein enable high-throughput sequencing of tumor sub-clones with high sensitivity and accuracy. Sequencing of tumor clones enables characterization of the genomic profiles that arise in a cancerous tumor of a subject. Specifically, the methods disclosed herein reconstruct tumor sub-clones in a sample. The methods described herein provide sequence coverage of tumor sub-clones in a tumorous cancer sample.

The methods disclosed herein include subjecting sequence data (i.e., sequence reads) generated from the methods disclosed herein to sequence analysis. The sequence reads are aligned to related genomic coordinates. Genomic coordinates are considered related when the sequence reads can be traced to an originating nucleic acid molecule (i.e., the nucleic acid encoding a specific tumor cell). In particular, the sequence reads are consolidated into one read per nucleic acid molecule (i.e., the nucleic acid encoding a specific tumor cell). In other words, this sequence analysis approach reconstructs the sequence read into its originating nucleic acid molecule. The originating nucleic acid molecule preferably encodes a tumor cell. Conventional analytical techniques can be applied to the analysis of the sequence data. Such techniques are known to those of skill in the art. For example, bioinformatics analysis can be used to analyze the sequence data (e.g., assemble the sequence reads).

Such sequence analysis includes methods in which sequence reads are aligned, such that each sequence can be attributable to its originating tumor cell. These methods typically involve de novo assembly. Alternatively, in some instances, genome mapping can be applied, in which sequence reads are assembled against an existing reference sequence (e.g., non-tumorous cells or healthy cells) to build a sequence that is similar, but not necessarily the same, as the reference sequence. For example, bioinformatics analysis is an exemplary platform that can be used to align the sequence reads.

Sequence reads generated from scRNA-seq sequence analysis or RNA-seq sequence analysis can be aligned using a spaced-seed indexing based algorithm or Burrows-Wheeler transform based algorithm. Exemplary aligners that can be used in the methods disclosed herein include TopHat2, STAR and HISAT. Other known read alignment tools can also be used.

The molecular barcodes can be trimmed from the sequence reads prior to sequence analysis. The molecular barcodes can be trimmed from the sequence reads prior to alignment of the sequence reads or after alignment of the sequence reads. In embodiments, the molecular barcodes are not trimmed from the sequence reads. When the molecular barcodes are not trimmed from the sequence reads, they are used to facilitate sequence analysis. In particular, the molecular barcodes can be used to guide the sequence read into its originating nucleic acid molecule. The originating nucleic acid molecule is a tumor cell.

In some instances an adaptor sequence that is attached to the sequence reads is trimmed from the sequence reads prior to sequence analysis. The adaptor sequence can be trimmed from the sequence reads prior to alignment of the sequence reads or after alignment of the sequence reads. In some embodiments, the adaptor sequences are not trimmed from the sequence reads. When the adaptor sequences are not trimmed from the sequence reads, they are used to facilitate sequence analysis. In particular, the adaptor sequences can be used to guide the sequence reads into its originating nucleic acid molecule. The originating nucleic acid molecule is a tumor cell.

In some embodiments, both the adaptor sequence and the incorporated molecular barcode are trimmed from the sequence reads prior to sequence analysis. In some cases, either the adaptor sequence or the incorporated molecular barcode are trimmed from the sequence reads prior to sequence analysis. The adaptor sequence and the incorporated molecular barcode can be trimmed from the sequence reads prior to alignment of the sequence reads or after alignment of the sequence reads. In certain embodiments, the adaptor sequence and the incorporated molecular barcode are not trimmed from the sequence reads. When the adaptor sequence and the incorporated molecular barcode are not trimmed from the sequence reads, they are used to facilitate sequence analysis. In particular, the adaptor sequence and the incorporated molecular barcode can be used to guide the sequence reads into its originating nucleic acid molecule. The originating nucleic acid molecule is a tumor cell. In other cases, only the adaptor sequence is trimmed from the sequence reads.

Each sequence read generated from sequencing may contain at least one overlapping portion with another sequence read. The overlapping portions of the nucleic acids of each nucleic acid sequence can be used to map the nucleic sequence to a particular tumor cell. These methods can include mapping sequence reads to a reference sequence read.

To compensate for artifacts (e.g., sequence reads that correspond to non-tumor cells) a filtering strategy can be coupled with the methods disclosed herein. The use of a filtering strategy in combination with the methods disclosed herein improves accuracy of tumor clonal profiling. The filtering strategy can be employed after sequencing of the genetic material. The filtering strategy can also be applied prior to sequence analysis of the sequence reads (i.e., before the sequence reads are aligned). The filtration step preferably excludes sequence reads that are not associated with tumor cells. Such sequence reads may be associated with normal cells. Furthermore, to compensate for amplification artifacts and sequencing error, the molecular barcode sequences can be clustered using tools known in the art. For example the Starcode tool (Zorita et al., Bioinformatics, 31:1913-1919 (2015)) may be used.

Once the sequence reads have been aligned to their originating nucleic acid (i.e., the nucleic acid encoding a tumor cell), self-similar tumor cells are mapped and clustered to a corresponding tumor sub-clone. As disclosed herein, self-similar tumor cells are tumor cells that are genetically derived from the same sub-clone. This can be determined based on sequence similarity and/or the tumor cells genotype. For example, tumor cells with highly similar genomes can be considered to be derived from the same sub-clone.

"Clustering" refers to the grouping or segmenting a collection of objects into subsets, subgroups or "clusters," such that those within each cluster are more closely related to one another than objects assigned to different clusters. Central to cluster analysis is the notion of degree of similarity (or dissimilarity) between the nucleic acid molecules encoding a tumor cell being clustered. Any number of approaches can be used for mapping and clustering self-similar tumor cells. In some cases, unsupervised clustering methods can be used. Unsupervised clustering methods can include the k-means algorithm, hierarchical clustering, density-based clustering, graph-based clustering, single-cell consensus clustering, Cophenetic correlation, or Bayesian Information Criterion (Andrews et al. Bioinformatics, 35(16):2865-2867 (2019). In embodiments, the clustering methods can be used independently or in combination.

Hierarchical clustering is the preferred mapping and clustering approach employed by the methods disclosed herein. "Hierarchical clustering" refers to the building (agglomerative), or break-up (divisive), of a hierarchy of clusters. The traditional representation of this hierarchy is a dendrogram, with individual elements at one end and a single cluster containing every element at the other. Agglomerative algorithms begin at the leaves of the tree, whereas divisive algorithms begin at the root. Methods for performing hierarchical clustering are well known in the art. Hierarchical clustering methods have been widely used to cluster biological samples based on their gene expression patterns and derive subgroup structures in populations of samples in biomedical research (Bhattacharjee et al., Proc Natl Acad Sci USA., 98:13790-13795 (2001); Hedenfalk et al., Natl Acad Sci USA., 100:2532-2537 (2003); Sotiriou et al., Proc Natl Acad Sci USA., 100:10393-10398 (2003); Wilhelm et al., Cancer Res., 62:957-960, (2002)). In embodiments, the hierarchical clustering method used herein can identify self-similar tumor cells by measuring the similarity between at least two tumor cells nucleic acid sequences. In embodiments, the hierarchical clustering method used herein can identify self-similar tumor cells by measuring the similarity between at least two tumor cell genomes. One way of measuring similarity can be the dot product between at least two nucleic acid molecules encoding a tumor cell that is normalized by the length of the subset of the nucleic acid sequences encoding tumor cells share in common. Preferably, each known nucleic acid molecule encoding a tumor cell is used to measure similarity.

In embodiments, the distance between the genomes of at least two cells is determined. Preferably the distance between the genome of all pairs of cells is determined. The cells can be self-similar tumor cells, but are not limited to self-similar tumor cells. In embodiments, the distance between at least two self-similar tumor cells is determined. Those skilled in the art would be familiar with methods for measuring the distance between cells. Pairwise sequence similarities using a similarity score can be used to map self-similar tumor cells to a corresponding tumor sub-clone (see, Fasterius and Szigyarto, Scientific Reports, 8(1):1-11 (2018); Maehara et al., Scientific Reports, 6(19620):1-11 (2015)). The similarity score is a weighted measure that incorporates both the number of matching nucleotides between two cells and possibly the total number of overlapping variants (i.e. positions with a confident variant call in both cells).

In embodiments, two tumor cells are considered "self-similar" if it has at least 70%, at least 75%, at least 80%, at least 85%, at least 90%, at least 91%, at least 92%, at least 93%, at least 94%, at least 95%, at least 96%, at least 97%, at least 98%, at least 99%, or greater, sequence similarity to another tumor cell.

Sequence reads assigned to a tumor sub-clone can then be pooled, that is reads are considered from the same genome.

Following pooling of the sequence reads encoding tumor sub-clones, variant calls for each tumor sub-clone are then performed. Variant calling sorts out the sequence reads into separate sequences that encode tumor sub-clones. Variant calling can provide a contiguous sequence encoding a single tumor sub-clone. In general, variant calling involves: mapping, pre-processing, variant evaluation, and post-filtering. See, Liu et al., Genome Biology, 20(242) (2019). Variant calling methods that can be used include, for example, SAMtools, the GATK pipeline, CTAT, FreeBayes, MuTect2, Strelka2, and VarScan2.

The methods disclosed herein provide sequence coverage of tumor sub-clones within a cancerous tumor. The methods disclosed herein have the capability for identifying any number of tumor sub-clones in a cancerous tumor sample. For example, the methods can identify about 1, 2, 3, 4, 5, 10, 15, 20, 30, 40, 50, 60, 70, 80, 90, 100, 150, 200, 300, 350, 400, 450, 500, 600, 700, 800, 900, 1000 or more tumor sub-clones in a cancerous tumor sample.

The present disclosure also provides computer control systems that are programmed to implement methods of the disclosure. The computer system can be used in nucleic acid sequencing methods, interpretation of nucleic acid sequencing data and characterization of tumor sub-clones in a cancerous tumor. The computer system can be an electronic device of a user or a computer system that is remotely located with respect to the electronic device.

E. Profiling

The disclosure also relates to profiling of cancerous tumors. Specifically, the heterogeneity of a tumor can be delineated. The methods disclosed herein provide sequences of tumor sub-clones within a cancerous tumor. This method allows for sequencing to detect low frequency genetic variants (i.e., minor tumor sub-clones) as well as high frequency genetic variants (i.e., primary tumor sub-clones). For example, sub-clone specific variants can be identified. Sub-clone specific variants can be indicative of the type, progression, and prognosis of the cancer. Profiling of the cancerous tumor can also be used to identify germline variants, as well as somatic variants. Clonal abundance can also be determined using the methods disclosed herein. The profiling technique can also be used to track sub-clonal evolution over time.

The methods disclosed herein can provide sequence coverage of all tumor sub-clones. The methods disclosed herein can provide sequence coverage of at least 50% of tumor sub-clones within a cancerous tumor, at least 60% of tumor sub-clones within a cancerous tumor, at least 65% of tumor sub-clones within a cancerous tumor, at least 70% of tumor sub-clones within a cancerous tumor, at least 75% of tumor sub-clones within a cancerous tumor, at least 80% of tumor sub-clones within a cancerous tumor, at least 85% of tumor sub-clones within a cancerous tumor, at least 90% of tumor sub-clones within a cancerous tumor, at least 95% of tumor sub-clones within a cancerous tumor, or greater. In embodiments, the methods disclosed herein can provide sequence coverage of at least 50% of primary tumor sub-clones within a cancerous tumor, at least 60% of primary sub-clones within a cancerous tumor, at least 65% of primary tumor sub-clones within a cancerous tumor, at least 70% of primary tumor sub-clones within a cancerous tumor, at least 75% of primary tumor sub-clones within a cancerous tumor, at least 80% of primary tumor sub-clones within a cancerous tumor, at least 85% of primary tumor sub-clones within a cancerous tumor, at least 90% of primary tumor sub-clones within a cancerous tumor, at least 95% of primary tumor sub-clones within a cancerous tumor, at least 96% of primary tumor sub-clones within a cancerous tumor, at least 97% of primary tumor sub-clones within a cancerous tumor, at least 98% of primary tumor sub-clones within a cancerous tumor, at least 99% of primary tumor sub-clones within a cancerous tumor, or 100% of primary tumor sub-clones within a cancerous tumor. In embodiments, the methods disclosed herein can provide sequence coverage of at least 1% of minor tumor sub-clones within a cancerous tumor, at least 5% of minor tumor sub-clones within a cancerous tumor, at least 10% of minor tumor sub-clones within a cancerous tumor, at least 15% of minor tumor sub-clones, at least 20% of minor tumor sub-clones within a cancerous tumor, at least 25% of minor tumor sub-clones within a cancerous tumor, at least 30% of minor tumor sub-clones within a cancerous tumor, at least 35% of minor tumor sub-clones within a cancerous tumor, at least 40% of minor tumor sub-clones within a cancerous tumor, at least 50% of minor tumor sub-clones within a cancerous tumor, at least 60% of minor tumor sub-clones within a cancerous tumor, at least 70% of minor tumor sub-clones within a cancerous tumor, at least 80% of minor tumor sub-clones within a cancerous tumor, at least 90% of minor tumor sub-clones within a cancerous tumor, or more.

The methods provided herein can provide sequence coverage of at least 1 tumor sub-clone, at least 2 tumor sub-clones, at least 3 tumor sub-clones, at least 4 tumor sub-clones, at least 5 tumor sub-clones, at least 6 tumor sub-clones, at least 7 tumor sub-clones, at least 8 tumor sub-clones, at least 9 tumor sub-clones, at least 10 tumor sub-clones, at least 12 tumor sub-clones, at least 14 tumor sub-clones, at least 16 tumor sub-clones, at least 18 tumor sub-clones, at least 20 tumor sub-clones, at least 25 tumor sub-clones, at least 30 tumor sub-clones, at least 40 tumor sub-clones, at least 50 tumor sub-clones, at least 100 tumor sub-clones, at least 200 tumor sub-clones, at least 300 tumor sub-clones, at least 400 tumor sub-clones, at least 500 tumor sub-clones, at least 600 tumor sub-clones, at least 700 tumor sub-clones, at least 800 tumor sub-clones, at least 900 tumor sub-clones, at least 1000 tumor sub-clones or more. In embodiments, the methods provided herein can provide sequence coverage of at least 1 primary tumor sub-clone, at least 2 primary tumor sub-clones, at least 3 primary tumor sub-clones, at least 4 primary tumor sub-clones, at least 5 primary tumor sub-clones, at least 6 primary tumor sub-clones, at least 7 primary tumor sub-clones, at least 8 primary tumor sub-clones, at least 9 primary tumor sub-clones, at least 10 primary tumor sub-clones, at least 15 primary tumor sub-clones, at least 20 primary sub-tumor clones or more.

The methods disclosed herein can be used to identify tumor neoantigens. Tumor neoantigens (also known as tumor-specific antigens) are protein repertoires that are displayed on the tumor cell surface and specifically recognized by neoantigen-specific T cell receptors in the context of major histocompatibility complexes (MHCs) molecules. See, Jiang et al., Journal of Hematology and Oncology, 12(32) (2019). Tumor neoantigens are not present on normal cells. Without being bound by theory, tumor neoantigens can be derived from single-nucleotide variants, insertions and deletions, gene fusions, frameshift mutations, structural variants, or open reading frames from viral genomes. The methods disclosed herein can be used to identify tumor neoantigens associated with the tumor clones. In embodiments, the methods disclosed herein can identify at least 10%, at least 20% of tumor neoantigens associated with a tumor clone, at least 25% of tumor neoantigens associated with a tumor clone, at least 30% of tumor neoantigens associated with a tumor clone, at least 40% of tumor neoantigens associated with a tumor clone, at least 50% of tumor neoantigens associated with a tumor clone, at least 60% of tumor neoantigens associated with a tumor clone, at least 70% of tumor neoantigens associated with a tumor clone, at least 75% of tumor neoantigens associated with a tumor clone, at least 80% of tumor neoantigens associated with a tumor clone, at least 85% of tumor neoantigens associated with a tumor clone, at least 90% of tumor neoantigens associated with a tumor clone, or more.

Profiling of cancerous tumors as disclosed herein can be used to identify mutations associated with a tumor clone based on allelic expression. In embodiments, allelic expression of single nucleotide variants, and small insertions and deletions, as well as other mutations can be characterized. Characterizing mutations based on allelic expression can be used to identify somatic variants.

The methods disclosed herein can be used for any suitable cancerous tumor, including hematological malignancy, solid tumors, sarcomas, carcinomas, and other solid and non-solid tumors. Illustrative suitable cancers include, for example, acute lymphoblastic leukemia (ALL), acute myeloid leukemia (AML), adrenocortical carcinoma, anal cancer, appendix cancer, astrocytoma, basal cell carcinoma, brain tumor, bile duct cancer, bladder cancer, bone cancer, breast cancer, bronchial tumor, carcinoma of unknown primary origin, cardiac tumor, cervical cancer, chordoma, colon cancer, colorectal cancer, craniopharyngioma, ductal carcinoma, embryonal tumor, endometrial cancer, ependymoma, esophageal cancer, esthesioneuroblastoma, fibrous histiocytoma, Ewing sarcoma, eye cancer, germ cell tumor, gallbladder cancer, gastric cancer, gastrointestinal carcinoid tumor, gastrointestinal stromal tumor, gestational trophoblastic disease, glioma, head and neck cancer, hepatocellular cancer, histiocytosis, Hodgkin lymphoma, hypopharyngeal cancer, intraocular melanoma, islet cell tumor, Kaposi sarcoma, kidney cancer, Langerhans cell histiocytosis, laryngeal cancer, lip and oral cavity cancer, liver cancer, lobular carcinoma in situ, lung cancer, macroglobulinemia, malignant fibrous histiocytoma, melanoma, Merkel cell carcinoma, mesothelioma, metastatic squamous neck cancer with occult primary, midline tract carcinoma involving NUT gene, mouth cancer, multiple endocrine neoplasia syndrome, multiple myeloma, mycosis fungoides, myelodysplastic syndrome, myelodysplastic/myeloproliferative neoplasm, nasal cavity and par nasal sinus cancer, nasopharyngeal cancer, neuroblastoma, non-small cell lung cancer, oropharyngeal cancer, osteosarcoma, ovarian cancer, pancreatic cancer, papillomatosis, paraganglioma, parathyroid cancer, penile cancer, pharyngeal cancer, pheochromocytomas, pituitary tumor, pleuropulmonary blastoma, primary central nervous system lymphoma, prostate cancer, rectal cancer, renal cell cancer, renal pelvis and ureter cancer, retinoblastoma, rhabdoid tumor, salivary gland cancer, Sezary syndrome, skin cancer, small cell lung cancer, small intestine cancer, soft tissue sarcoma, spinal cord tumor, stomach cancer, T-cell lymphoma, teratoid tumor, testicular cancer, throat cancer, thymoma and thymic carcinoma, thyroid cancer, urethral cancer, uterine cancer, vaginal cancer, vulvar cancer, and Wilms tumor. Preferably, the cancer is breast cancer, ovarian cancer, prostate cancer, lung cancer, kidney cancer, gastric cancer, colon cancer, testicular cancer, head and neck cancer, pancreatic cancer, brain cancer, melanoma, lymphoma, or leukemia. Breast cancer and melanoma are of particular interest. Alternatively, lung cancer, gastric cancer, head and neck cancer, and leukemia are also of particular interest.

The cancer can be a solid tumor or a liquid tumor. The methods disclosed herein are preferably suited for solid tumors. The tumor can be a primary tumor (e.g., a tumor that is at the original site where the tumor first arose).

F. Samples

The methods disclosed herein comprise profiling cancerous tumors derived from biological material containing tumor cells. The biological material can be obtained from human or non-human subjects. Preferentially, the biological material is obtained from a human. The biological material can be obtained from a variety of biological sources that comprise cancerous tumors. The biological material can be from a tumor site or circulating tumor cells from blood. Exemplary samples can include, but are not limited to, bodily fluid, tissue biopsies, blood samples, serum plasma, stool, skin samples, and the like. The source of a sample can be a solid tissue sample such as a tumor tissue biopsy. Tissue biopsy samples may be biopsies from, e.g., lung, prostate, colon, skin, breast tissue, or lymph nodes. Samples can also be e.g., samples of bone marrow, including bone marrow aspirate and bone marrow biopsies. Samples can also be liquid biopsies, e.g., circulating tumor cells, cell-free circulating tumor DNA, or exosomes. Blood samples can be whole blood, partially purified blood, or a fraction of whole or partially purified blood, such as peripheral blood mononucleated cells (PBMCs).

The biological material described herein can be obtained directly from a subject, derived from a subject, or derived from samples obtained from a subject, such as cultured cells derived from a biological fluid or tissue sample. The biological material can be a fresh sample. The fresh sample can be fixed after removal from the subject with any known fixatives (e.g. formalin, Zenker's fixative, or B-5 fixative). The biological material can also be archived samples, such as frozen samples, cryopreserved samples, of cells obtained directed from a subject or of cells derived from cells obtained from a subject. Preferably, the biological material obtained from a subject is a fresh tumor biopsy.

The biological material can be obtained from a subject by any means including, but not limited to, tumor biopsy, needle aspirate, scraping, surgical incision, venipuncture, or other means known in the art. A tumor biopsy is a preferred method for obtaining the biological material. The tumor biopsy can be obtained from any cancerous site, for example, a primary tumor or a secondary tumor. A tumor biopsy from a primary tumor is generally preferred. Those skilled in the art will recognize other suitable techniques for obtaining biological material containing tumor cells.

The biological material can be obtained from the subject in a single procedure. The biological material can be obtained from the subject repeatedly over a period of time. For example, once a day, once a week, monthly, biannually, annually. Obtaining numerous samples over a period of time can be used to profile and/or monitor tumor clones within the cancerous tumor. Profiling of the tumor clones over a period of time can be used to identify new or mutated tumors. Alternatively, profiling of the tumor clones over a period of time can be used to monitor the effect of cancer treatment. The biological material can be obtained from the same tumor or a different tumor.

4. EQUIVALENTS

It will be readily apparent to those skilled in the art that other suitable modifications and adaptions of the methods of the invention described herein are obvious and may be made using suitable equivalents without departing from the scope of the disclosure or the embodiments. Having now described certain compounds and methods in detail, the same will be more clearly understood by reference to the following examples, which are introduced for illustration only and not intended to be limiting.

5. EXAMPLES 1.1 Collecting Tumor Cells from a Subject

Tumor cells will be purified to increase read coverage of mutated tumor DNA material over non-mutated normal cells. Tumor cells will be purified using mechanical disruption in combination with collagenase or DNAse digests and subsequently extensive cell washing will be performed. Alternatively, a tumor dissociation commercial kit, such as Miltenyi gentleMACS will be used according to the manufactures protocol. We may also use microscopy aided dissection of tumor material (e.g. laser capture micro-dissection) to purify the tumor cells. After generating single-cell solutions of the tumor tissue, the tumor will be stained with tumor-specific cell markers (e.g. MCAM, MCSP, E-cadherin, HER2/neu) for positive selection. As an alternative or in combination, the tumor will be stained with markers for tumor microenvironment/immune infiltrates (e.g. CD3, CD20, CD16). Staining will allow for a magnetic of flow-cytometry cell sorting based purification of tumor cells, and removal of normal cell content.

1.2 Single cell Sequencing of Tumor Cell Clones

Next, the genetic material of single cells will be barcoded (i.e., unique molecular barcode). Cells will be seeded individually into microwell plates by single cell sorting or limiting dilution. RNA/DNA sequencing libraries will be generated in individual wells and unique barcodes will be added. Alternatively, such microwells, or lower volume equivalents (nanowells/picowells) will contain immobilized primers to initiate reverse transcription or amplification of the genetic material. The primers will contain the unique molecular barcode which will be attached during the amplification steps. We may employ a microfluidic device to barcode the genetic material, as well as encapsulation of individual cells into vesicles containing amplification and barcode-attachment chemistries.

Once a unique molecular barcode has been attached to the nucleic acids from a single cell, conventional next generation sequencing will be performed to generate a library of the pooled products. The pooled products will then be sequenced.

In a method variation, barcodes to both, RNA and DNA of single cells, will be attached simultaneously and allow for discrimination of cell identity and RNA vs. DNA origin.

1.3 Next Generation Sequence Analysis of Barcoded Single Cell Reads

Quality clipping, mapping, and alignment will be performed using standard methods, e.g. DRAGEN BioIT suite, CellRanger, or BWA-MEM. Then, individual cell reads as identified by unique molecular barcode sequences will be grouped and assembled using a reference genome (e.g. hg19). This will occur independently for RNA and DNA reads. RNA reads per transcript that are aligned will then be counted to derive an expression measure. In the next step, all reads will be analyzed using a somatic variant calling algorithm with optimized settings for low read coverage, to generate lists of somatic variant calls for each cell. If RNA and DNA are used in conjunction, variant calls from RNA and DNA will be concatenated, and custom algorithms to derive confidence scores for individual variant calls (e.g. supported by DNA and RNA) will be derived.

1.4 Grouping of Cells into Sub-Clones

Next, a matrix of observed variants will be generated (cell ID×variant), and cells will be clustered by their mutational profiles. Examples for clustering are hierarchical clustering, t-distributed stochastic neighbor embedding (t-SNE), k-means clustering, or uniform manifold approximation and projection (UMAP) operating on variant confidence scores or read coverage metrics. If a binary matrix (variant exists/does not exists×cell ID) is used as input, the cell-to-cell distance will be calculated e.g. using the Jaccard index, and the resultant distance matrix is clustered using abovementioned methods.

These methods (other than k-means clustering) will result either in a low-dimensional projection (t-DNA, UMAP) or cluster hierarchy. Conventional methods to identify the optimized cluster split like Louvian method in combination with cluster fit metrics like elbow criterion will then be used to assign individual cells to tumor sub-clones. Alternatively, k-means clustering or its generalization (e.g., mixture models) will be used in conjunction with methods that identify and optimal value for k.

Such clustering approaches will be used with DNA/RNA expression or combined DNA and RNA reads from all cells per sub-clone.

What is claimed:

1. A method of profiling a cancerous tumor to identify tumor sub-clones, comprising:
   a) harvesting genetic material from a biological material comprising a plurality of tumor cells of a subject;
   b) attaching a molecular barcode to the genetic material;
   c) performing molecular barcode sequencing of the genetic material to yield sequence reads;
   d) for each single cell of the plurality of tumor cells, assembling the sequence reads of the genetic material of the single cell of the plurality of tumor cells into a tumor cell sequence of the single cell of the plurality of tumor cells;
   e) clustering the tumor cell sequences of the single cells;
   f) identifying self-similar tumor cells based on the clustering of the tumor cell sequences of the single cells; wherein a cluster of self-similar tumor cells are deemed to be a tumor sub-clone;
   g) pooling the sequence reads representing each tumor sub-clone; and
   h) performing variant calls for each tumor sub-clone;
   wherein sequence coverage of the tumor sub-clone within the cancerous tumor is obtained and/or the genome of the tumor sub-clone is determined; thereby identifying each tumor sub-clone within the cancerous tumor.

2. The method of claim 1, further comprising filtering sequence reads to exclude sequence reads that are not associated with tumor cells after step (c) performing molecular barcode sequencing of the genetic material.

3. The method of claim 1, wherein the genetic material is DNA or RNA.

4. The method of claim 3, wherein the genetic material is RNA.

5. The method of claim 4, wherein RNA is used to identify allelic mutations.

6. The method of claim 1, wherein the biological material comprising tumor cells is from a tumor site or circulating tumor cells from blood.

7. The method of claim 1, wherein the biological material is obtained from a tumor biopsy.

8. The method of claim 7, wherein the tumor biopsy is from a solid tumor.

9. The method of claim 7, wherein the tumor biopsy is from a primary tumor.

10. The method of claim 7, wherein the tumor biopsy is a metastasized tumor.

11. The method of claim 1, wherein the tumor is breast cancer, ovarian cancer, prostate cancer, lung cancer, kidney cancer, gastric cancer, colon cancer, testicular cancer, head and neck cancer, pancreatic cancer, brain cancer, melanoma, lymphoma, or leukemia.

12. The method of claim 11, wherein the cancerous tumor is breast cancer or melanoma.

13. The method of claim 1, wherein the molecular barcode is a nucleotide sequence.

14. The method of claim 1, wherein the molecular barcode is an oligonucleotide.

15. The method of claim 14, wherein the oligonucleotide comprises 2 to 60 nucleotides.

16. The method of claim 1, wherein the molecular barcode is ligated to the 3' end of the genetic material, or the 5' end of the genetic material.

17. The method of claim 1, wherein the genetic material further comprises an adaptor sequence.

18. The method of claim 1, wherein sequence coverage of all primary sub-clones is obtained.

19. The method of claim 1, wherein molecular barcode sequencing is performed using next generation sequencing or single-cell RNA sequencing.

20. The method of claim 1, wherein the sequence of tumor sub-clones within a cancerous tumor is used to identify neoantigens.

21. The method of claim 1, wherein the genetic material comprises both DNA and RNA, and wherein a molecular barcode for DNA and a molecular barcode for RNA are different to allow for discrimination of RNA versus DNA.

22. The method of claim 1, wherein the clustering is an unsupervised clustering method selected from the group consisting of k-means algorithm, hierarchical clustering, density-based clustering, graph-based clustering, single-cell consensus clustering, Cophenetic correlation, Bayesian Information Criterion, and a combination thereof.

23. The method of claim 1, wherein the clustering is an unsupervised hierarchical clustering method.

24. The method of claim 23, wherein the unsupervised hierarchical clustering method measures the similarity between at least two tumor cell sequences from different self-similar tumor cells.

25. A method of profiling a cancerous tumor to identify tumor sub-clones, comprising:
   a) harvesting genetic material from a biological material comprising a plurality of tumor cells of a subject;
   b) attaching a molecular barcode to the genetic material, wherein the molecular barcode is unique for each single cell of the plurality of tumor cells of a subject;
   c) performing molecular barcode sequencing of the genetic material to yield sequence reads;
   d) for each single cell of the plurality of tumor cells, assembling the sequence reads of the genetic material of the single cell of the plurality of tumor cells into a tumor cell sequence of the single cell of the plurality of tumor cells;
   e) clustering the tumor cell sequences of the single cells;
   f) identifying self-similar tumor cells based on the clustering of the tumor cell sequences of the single cells; wherein a cluster of self-similar tumor cells are deemed to be a tumor sub-clone;
   g) pooling the sequence reads representing each tumor sub-clone; and
   h) performing variant calls for each tumor sub-clone;
   wherein sequence coverage of the tumor sub-clone within the cancerous tumor is obtained and/or the genome of the tumor sub-clone is determined; thereby identifying each tumor sub-clone within the cancerous tumor.

* * * * *